(12) United States Patent
Yan (10) Patent No.: US 8,375,974 B2
(45) Date of Patent: Feb. 19, 2013

(54) TEMPERATURE CONTROLLING DEVICE

(75) Inventor: Liguo Yan, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 286 days.

(21) Appl. No.: 13/007,730

(22) Filed: Jan. 17, 2011

(65) Prior Publication Data

US 2012/0180887 A1    Jul. 19, 2012

(51) Int. Cl.
*G05D 11/00* (2006.01)
(52) U.S. Cl. ............ 137/100; 137/625.41; 251/118; 251/127
(58) Field of Classification Search ............ 137/98, 137/100, 315.01, 315.09, 315.11, 315.12, 137/454.6, 625.4, 625.41; 251/118, 127
See application file for complete search history.

(56) References Cited

U.S. PATENT DOCUMENTS

| | | | | |
|---|---|---|---|---|
| 3,920,043 A | * | 11/1975 | Fowell | 137/625.17 |
| 4,157,099 A | * | 6/1979 | Delker et al. | 137/625.17 |
| 4,218,041 A | * | 8/1980 | Bernat | 251/127 |
| 4,301,836 A | * | 11/1981 | Hunziker | 137/625.4 |
| 4,596,376 A | * | 6/1986 | Knapp | 251/127 |
| 4,627,771 A | * | 12/1986 | Kieninger | 407/39 |
| 4,854,347 A | * | 8/1989 | Knapp | 137/625.4 |
| 4,903,725 A | * | 2/1990 | Ko | 137/454.5 |
| 4,941,506 A | * | 7/1990 | Bergmann | 137/625.4 |
| 4,986,306 A | * | 1/1991 | Ferrari | 137/625.17 |
| 5,303,736 A | * | 4/1994 | Orlandi | 137/625.4 |
| 5,332,003 A | * | 7/1994 | Nikolayczik | 137/625.17 |
| 5,348,042 A | * | 9/1994 | Wagner et al. | 137/237 |
| 5,469,114 A | * | 11/1995 | Saxena | 330/107 |
| 5,490,540 A | * | 2/1996 | Vom Dahl et al. | 137/625.17 |
| 6,176,168 B1 | * | 1/2001 | Keil et al. | 89/6.5 |

* cited by examiner

*Primary Examiner* — John Rivell
*Assistant Examiner* — R. K. Arundale (57) ABSTRACT

A temperature controlling device contains a base including a top wall and a peripheral wall; the top wall including a first hole and a second hole; a temperature balance valve retained in the base and including a first inlet, a second inlet, a first outlet, and a second outlet; a lower ceramic member installed on the top wall and including a second cavity, a first orifice, and a second orifice to flow the hot water; an upper ceramic member fixed on a top end of the lower ceramic member and including a third cavity; the third cavity including a close face; a control shaft including an extension, a radial extending disc, and a forcing end disposed on a top end thereof to input a rotating power; a housing served to cover the base, between the housing and the base being defined a receiving space, and the housing includes an aperture.

12 Claims, 12 Drawing Sheets

TEMPERATURE CONTROLLING DEVICE

BACKGROUND OF THE INVENTION

1. Field of the Invention

The present invention relates to a temperature controlling device with a temperature balance valve.

2. Description of the Prior Art

A conventional temperature controlling device with a pressure balance valve is widely used in a showering equipment, wherein a handle of the temperature controlling device is rotated to actuate a control lever, such that an upper ceramic member and a fixed lower ceramic member are actuated to rotate. Because the upper ceramic member includes an inflow chamber and a close face formed on a bottom end thereof, when the handle is in a close state, a cold and a hot waters flow into a first hole to flow the cold water and a second hole to flow the hot water of the lower ceramic member from a first inlet to flow the cold water and a second inlet to flow the hot water of the pressure balance valve and are stopped by the close face of the upper ceramic member, thereby closing the temperature controlling device without flowing water.

When the handle is rotated to turn on the temperature controlling device, the inflow chamber of the upper ceramic member is rotated to communicate with the first hole of the lower ceramic member and a cavity to flow the cold and the hot waters so that the cold water flows into a channel to flow the cold and the hot waters from the first hole via the inflow chamber, the cavity, and a third hole to flow the cold and the hot waters, thus flowing the cold water. After the handle is rotated continuously, the inflow chamber of the upper ceramic member communicates with the second hole of the lower ceramic member gradually so that after the cold and the hot waters from the first and the second holes flow into the inflow chamber, they are guided into the cavity to be mixed together and then flow out of the channel, flowing the mixed water. When a rotating angle of the handle is increased, a temperature of the mixed water becomes high. To avoid a high temperature of the mixed water, the control lever is used to match with an adjusting mechanism, thereby limiting the rotating angle of the control lever.

However, the cavity of the lower ceramic member is fixed on one side of the temperature controlling device, when the handle is turned, a water pressure is gathered between the cavity and the inflow chamber to generate unsymmetrical force, hence a rotating resistance of the upper ceramic member relative to the lower ceramic member increases, the handle is not shifted smoothly.

Besides, when the inflow chamber communicates with the first hole of the lower ceramic member, the cold waters from the first hole and the inflow chamber generate a pressure difference to impact the cavity of the lower ceramic member, causing water hammer noises.

To decrease the rotating resistance of the upper ceramic member, lubricating oil is applied on a contacting surface of the upper ceramic and the lower ceramic, but the lubricating oil will disappear after a period of time to cause an unsmooth rotation of the handle.

Furthermore, the faucet is connected on a lower side of the temperature controlling device, and a spray shower head is coupled on an upper side of the temperature controlling device, a pull bar to distribute water is fixed on the faucet and is in a turn-on state so that the handle of the temperature controlling device is rotated, the mixed water from the temperature controlling device is guided to flow out of the faucet, supplying water from the faucet; and when the pull bar of the faucet is pulled upward, the flowing water is stopped, and then the mixed water is guided to flow out of the spray shower head, supplying water from the spray shower head. Nevertheless, a flowing direction of the mixed water of the temperature controlling device is not limited only to flow out of the faucet, when the water flows out of the faucet, even though the pull bar is not pulled upward, a part of the mixed water from the temperature controlling device will flow toward the spray shower head, leaking water from the spray shower head.

The present invention has arisen to mitigate and/or obviate the afore-described disadvantages.

SUMMARY OF THE INVENTION

The primary object of the present invention is to provide a temperature controlling device that is capable of overcoming the shortcomings of the conventional temperature controlling device.

Further object of the present invention is to provide a temperature controlling device that is capable of decreasing water impact and water hammer noises, stabilizing water flow and preventing the spray shower head from leaking water.

Another object of the present invention is to provide a temperature controlling device that is capable of lowering a rotating resistance of the upper ceramic member so that the control shaft is rotated easily and smoothly.

Also another object of the present invention is to provide a temperature controlling device that is capable of lubricating the lower ceramic member and the close face of the upper ceramic member to decrease the rotating resistance of the upper ceramic member relative to the lower ceramic member, thereby shifting the handle easily and stably.

Furthermore, the noise eliminating posts of the base are capable of providing shock absorbing and water guiding effects to eliminate water hammer resulting from the pressure difference.

To obtain the above objectives, a temperature controlling device provided by the present invention contains:

a base including a top wall and a peripheral wall to define a chamber with a mouth facing downward; the top wall including a first hole to flow the cold water and a second hole to flow the hot water, both of which are symmetrical to each other and communicate with the chamber; between one side of a bottom end of the peripheral wall and the top wall being defined a tunnel to flow the cold and the hot waters separating from the chamber, the top wall including a plurality of noise eliminating posts arranged thereon relative to the tunnel;

a temperature balance valve retained in the chamber of the base and including a first inlet to flow the cold water and a second inlet to flow the hot water, both of which are disposed on two sides of a bottom end of the temperature balance valve respectively, a first outlet to flow the cold water and a second outlet to flow the hot water, both of which are disposed on two sides of a top end of the temperature balance valve respectively are communicated with the first hole and the second hole individually;

a lower ceramic member installed on the top wall of the base and including a wing-shaped second cavity disposed on a top surface thereof, a first orifice to flow the cold water and a second orifice to flow the hot water fixed on two sides of the second cavity respectively to communicate with the first hole and the second hole of the top wall of the base; the second cavity including a first opening fixed on one end thereof to insert the noise eliminating post of the base into the second cavity therefrom and a second opening fixed on another end thereof to communicate with the tunnel of the base;

an upper ceramic member actuated to be fixed on a top end of the lower ceramic member and including a wing-shaped third cavity disposed on a bottom end thereof to correspond to the first orifice, the second orifice, and the second cavity of the lower ceramic member; the third cavity including a close face defined on a bottom surface thereof to close or open the first orifice and the second orifice of the lower ceramic member with a rotation of the upper ceramic member;

a control shaft including an extension and a radial extending disc disposed on a bottom end of the extension; the control shaft including a forcing end disposed on a top end thereof to input a rotating power;

a housing served to cover the base, and between the housing and the base being defined a receiving space to receive and limit the lower ceramic member, the upper ceramic member, and the control shaft, and the housing includes an aperture fixed on a top end thereof to communicate with the receiving space and to extend out of the extension of the control shaft.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
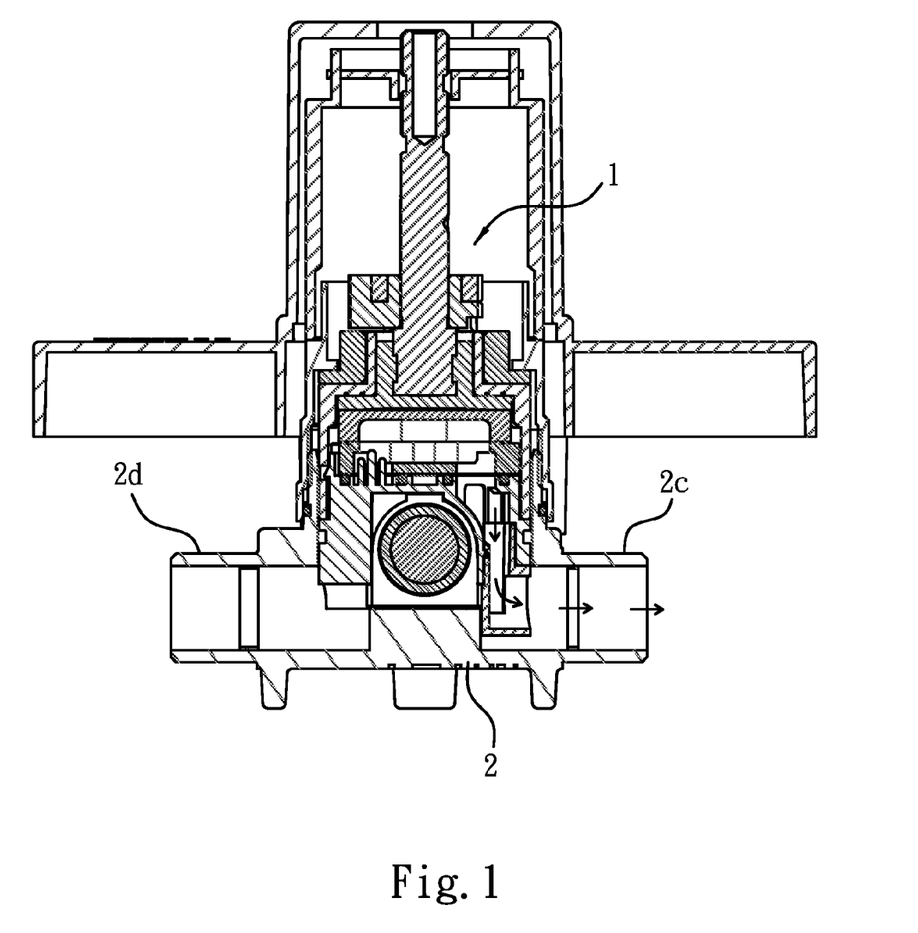
FIG. 1 is a cross sectional view showing a temperature controlling device of a preferred embodiment of the present invention being installed in a showering equipment.
Figure 2:
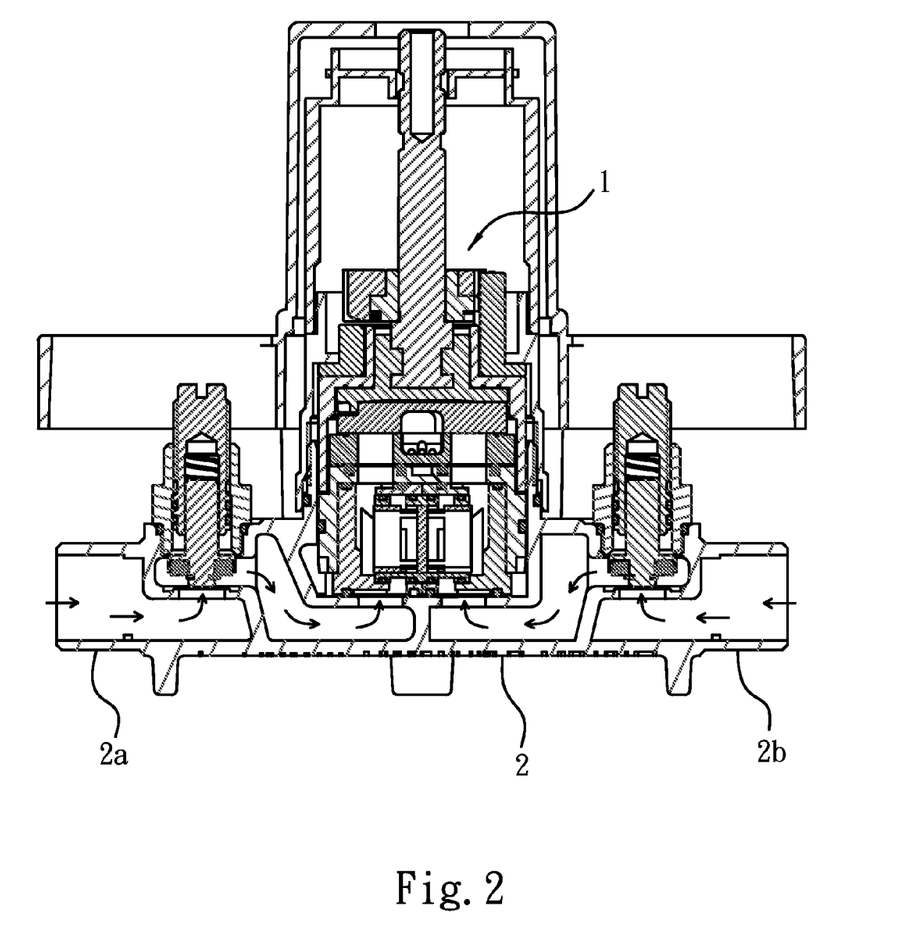
FIG. 2 is another cross sectional view showing the temperature controlling device of the preferred embodiment of the present invention being installed in the showering equipment.
Figure 3:
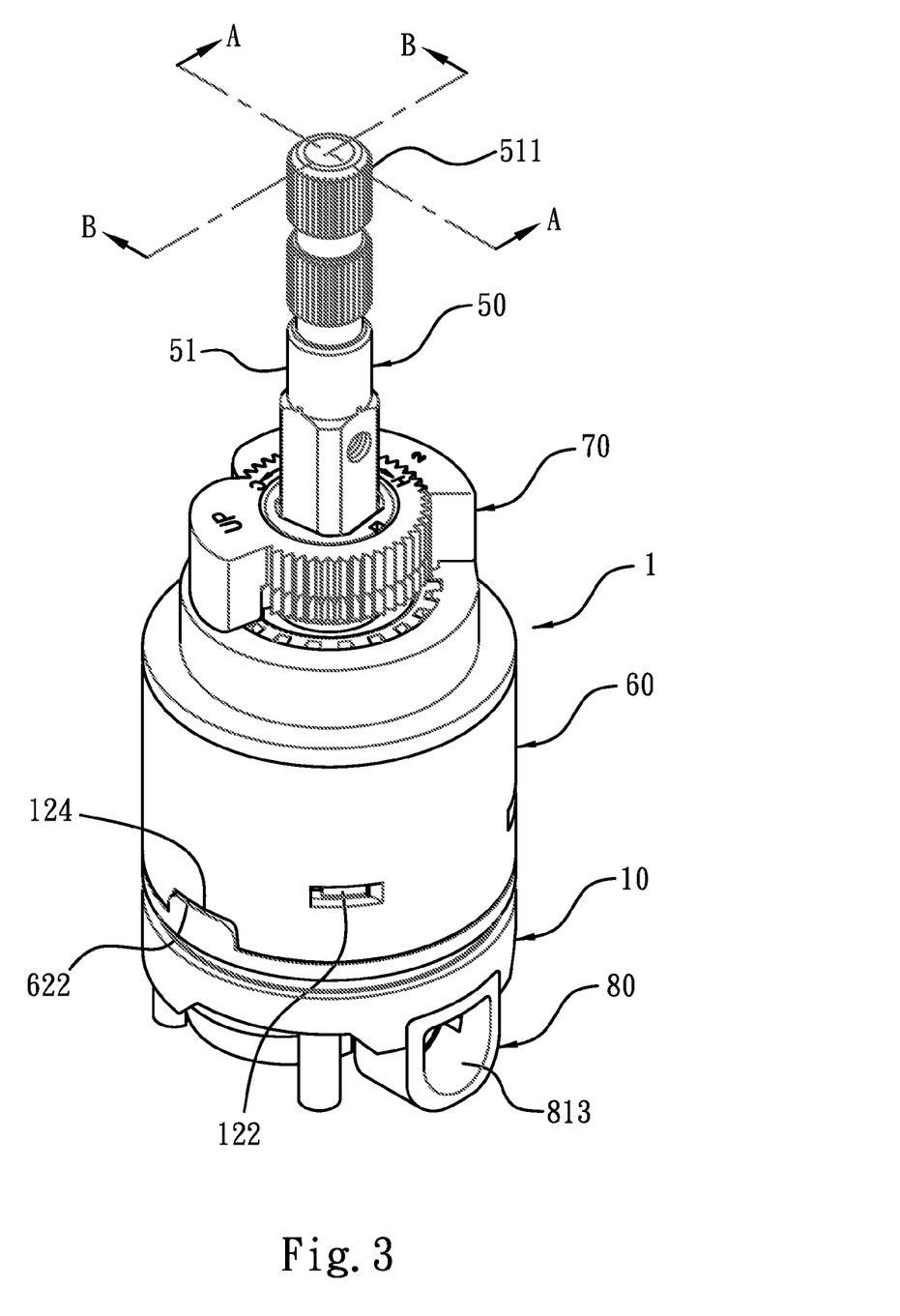
FIG. 3 is a perspective view showing the assembly of the temperature controlling device according to the preferred embodiment of the present invention.
Figure 4:
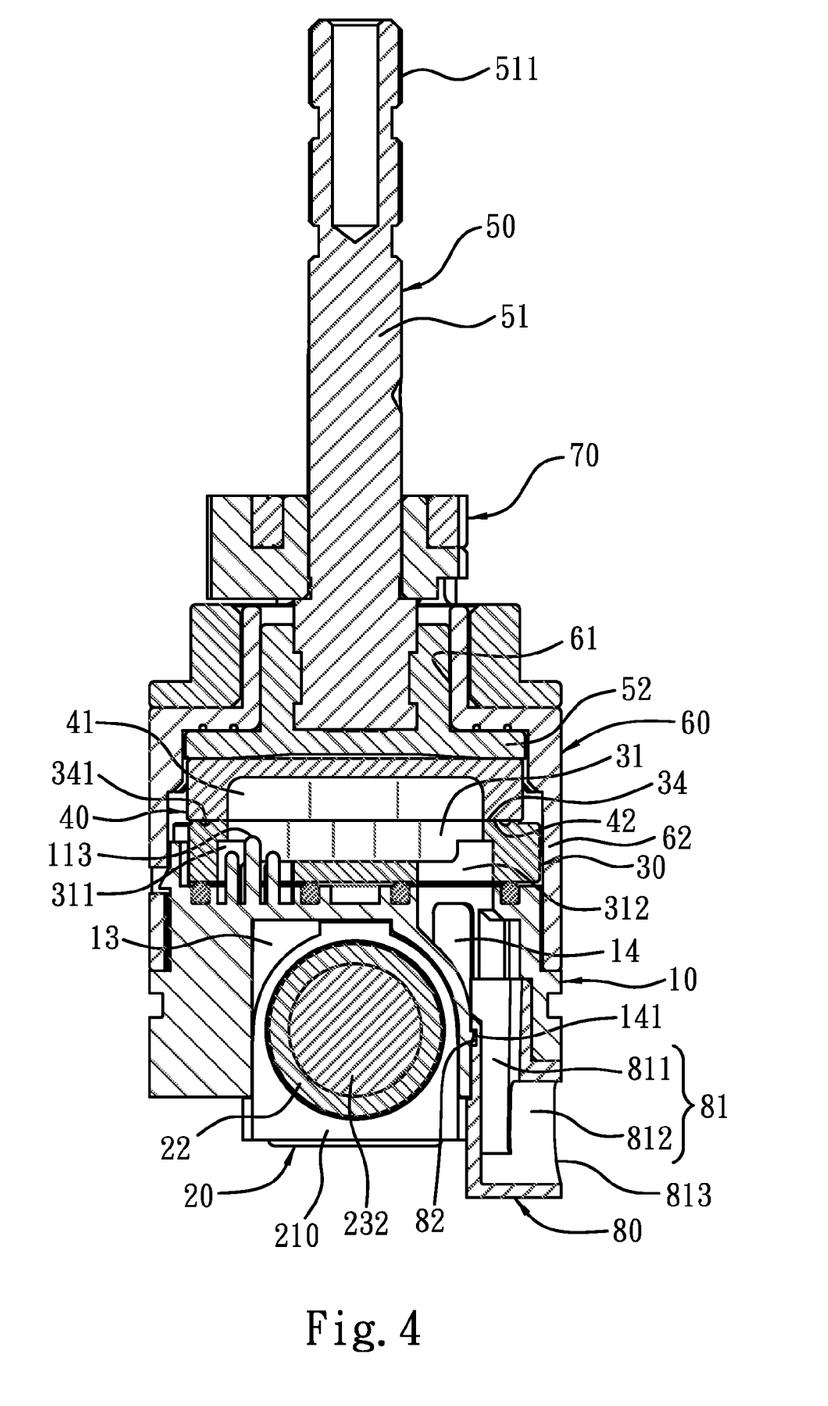
FIG. 4 is a cross sectional view taken along the line A-A of FIG. 3.
Figure 5:
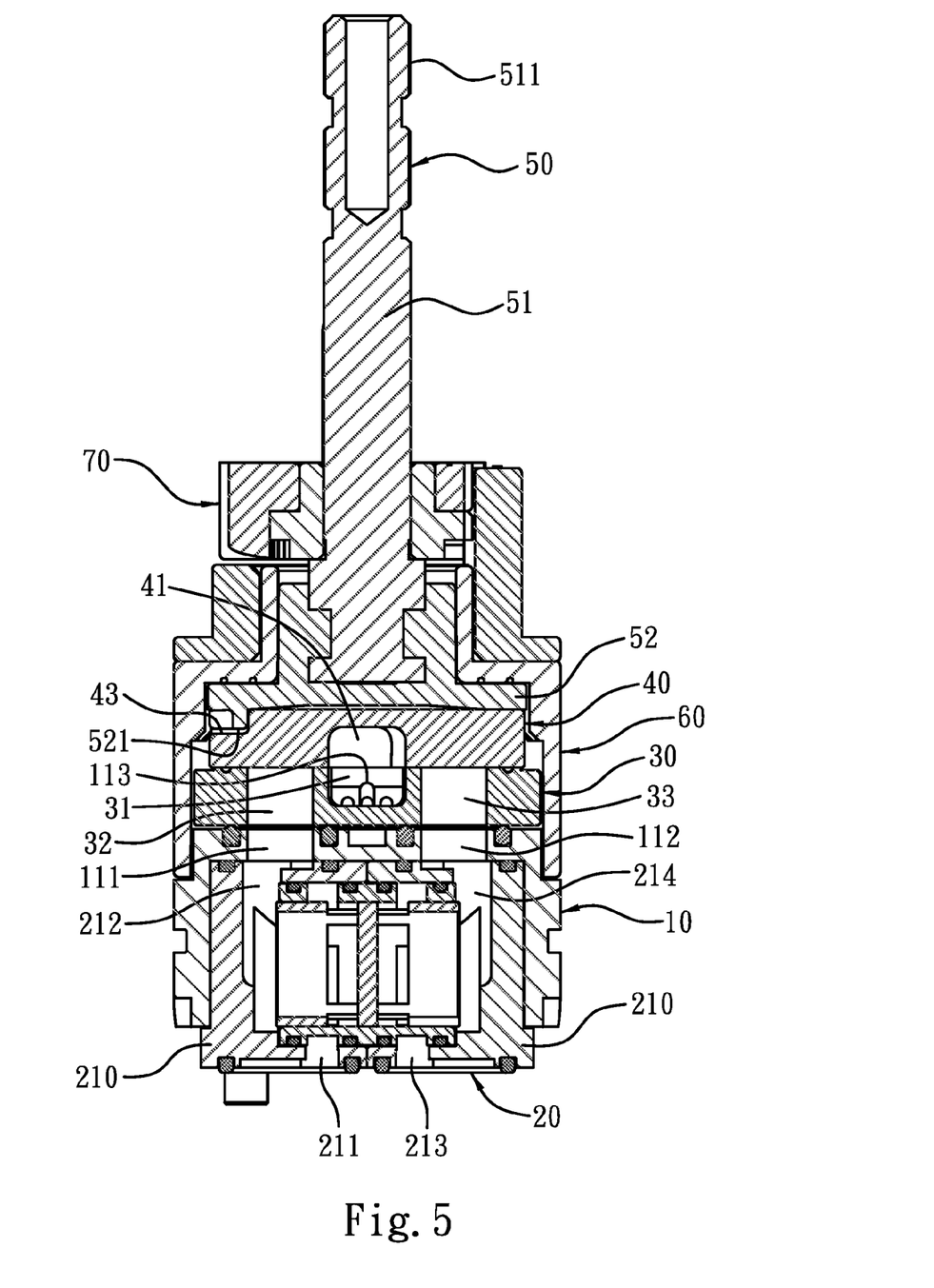
FIG. 5 is a cross sectional view taken along the line B-B of FIG. 3.

Referring to FIGS. 1-3, a temperature controlling device 1 according to a preferred embodiment of the present invention is installed in a cross water pipe 2 of a showering equipment, the water pipe 2 includes a first channel 2a to flow cold water and a second channel 2b to flow hot water, both of which are separated apart from each other, so that the cold and the hot waters are guided into the temperature controlling device 1, the temperature controlling device 1 also includes a third channel 2c and a fourth channel 2d, both of which are in communication with each other; wherein the third channel 2c is coupled with a faucet and includes a lever disposed thereon to distribute the waters; the fourth channel 2d is connected with a spray shower head; when turning on the temperature controlling device 1 by rotating a handle of the temperature controlling device 1, the cold and the hot waters from the temperature controlling device 1 flow out of the faucet via the third channel 2c; when a lever of the third channel 2c is pulled upward, the cold and the hot waters are guided into the spray shower head through the fourth channel 2d and then flow out of the spray shower head.

As shown in FIGS. 4-7, the temperature controlling device 1 comprises a base 10, a pressure balance valve 20, a lower ceramic member 30, an upper ceramic member 40, a control shaft 50, a housing 60, an adjusting mechanism 70, and a watering component 80.

Figure 8:
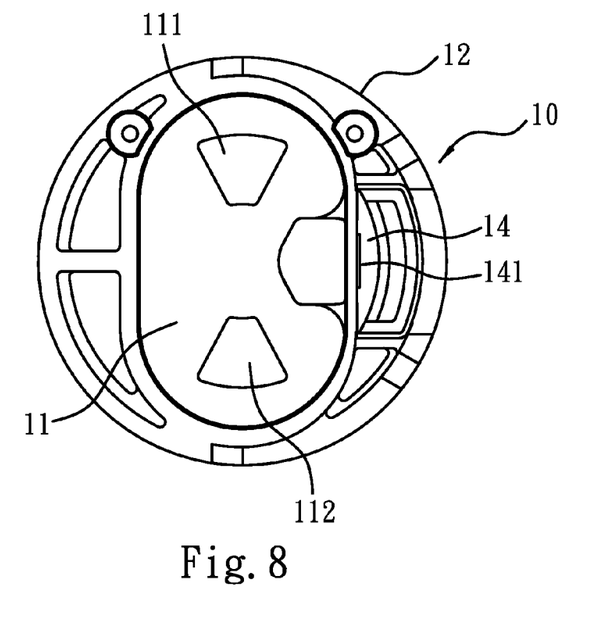
FIG. 8 is a cross-sectional plan view showing the assembly of a base of the temperature controlling device according to the preferred embodiment of the present invention.
Figure 9:
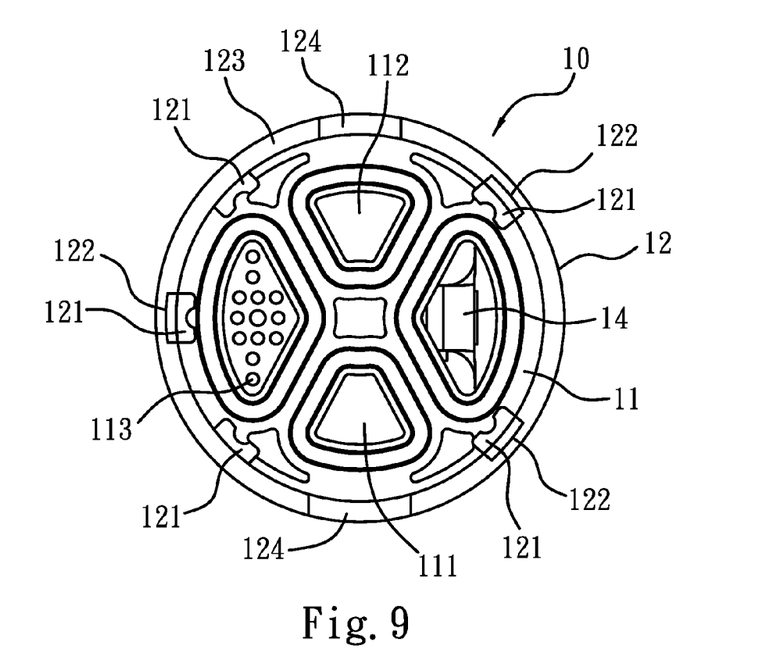
FIG. 9 is another cross-sectional plan view showing the assembly of the base of the temperature controlling device according to the preferred embodiment of the present invention.

With reference to FIGS. 8 and 9, the base 10 includes a top wall 11 and a peripheral wall 12 to define a chamber 13 with a mouth facing downward; the top wall 11 includes a first hole 111 to flow the cold water and a second hole 112 to flow the hot water, both of which are symmetrical to each other and communicate with the chamber 13; between one side of a bottom end of the peripheral wall 12 and the top wall 11 is defined a tunnel 14 to flow the cold and the hot waters separating from the chamber 13, the top wall 11 includes a plurality of noise eliminating posts 113 arranged thereon relative to the tunnel 14.

The peripheral wall 12 of the base 10 includes a number of positioning blocks 121 formed on a top end thereof; there are five positioning blocks 121 provided in this embodiment, and among three of the positioning blocks 121 are equiangularly arranged three integrally connected hooks 122 respectively.

The tunnel 14 of the base 10 includes a first locking projection 141 disposed on an inner surface thereof relative to the chamber 13, and the peripheral wall 12 includes a stepped fringe 123 fixed on a middle section thereof, the stepped fringe 123 includes two limiting tabs 124 fixed thereon.

Figure 10:
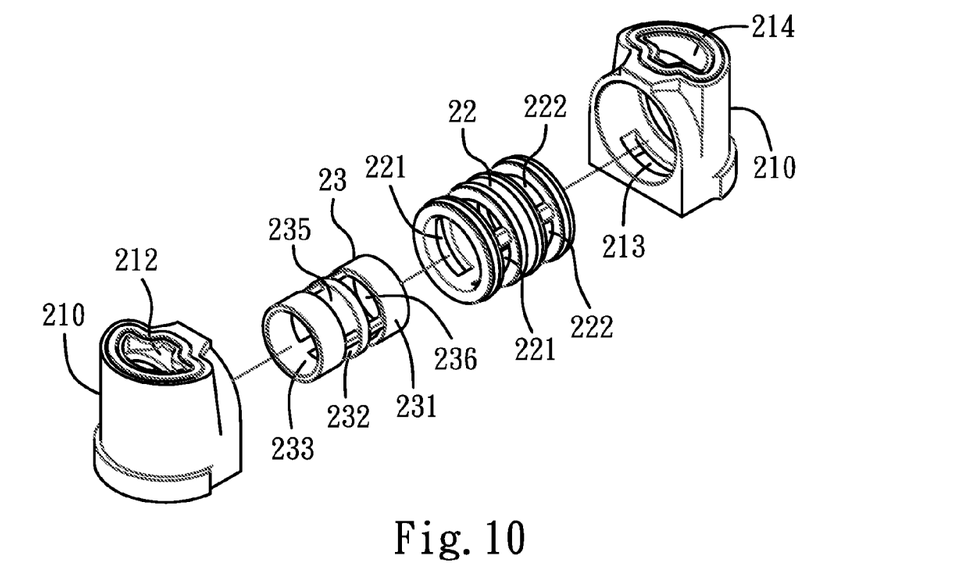
FIG. 10 is a perspective view showing the exploded components of a pressure balance valve of the temperature controlling device according to the preferred embodiment of the present invention.
Figure 11:
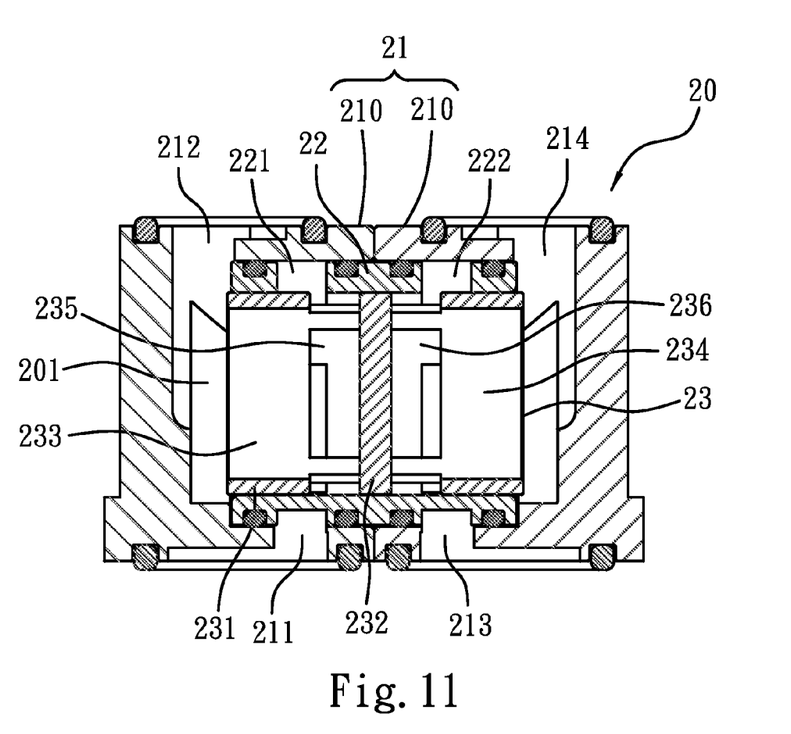
FIG. 11 is a cross sectional view showing the assembly of the pressure balance valve of the temperature controlling device according to the preferred embodiment of the present invention.

As illustrated in FIGS. 10 and 11, the temperature balance valve 20 is retained in the chamber 13 of the base 10 and includes a holder 21, a casing 22 secured in the holder 21, and a valve core 23 moving axially in the casing 22.

The holder 21 is comprised of two symmetrical covers 210 which are separated apart from each other and combined together, and a first cavity 201 is defined between the combined covers 210, one of the covers 210 includes a first inlet 211 to flow the cold water disposed on a bottom end thereof, a first outlet 212 to flow the cold water fixed on a top end thereof, and another cover 210 includes a second inlet 213 to flow the hot water formed on a bottom end thereof and a second outlet 214 to flow the hot water arranged on a top end thereof, and the first outlet 212 and the second outlet 214 are communicated with the first hole 111 and the second hole 112 individually.

The casing 22 is defined in the first cavity 201 of the holder 21, and includes a plurality of first cold-water grooves 221 to communicate with the first inlet 211 and a number of first hot-water grooves 222 to communicate with the second inlet 213.

The valve core 23 moves axially in the casing 22 and formed in a sleeve shape and includes an annular fringe 231, a sensing fringe 232 connected with the annular fringe 231, a cold-water pressure room 233 and a hot-water pressure room 234 defined in the annular fringe 231 of two sides of the sensing fringe 232, and a plurality of second cold-water grooves 235 to communicate with the first cold-water grooves 221 individually, the hot-water pressure room 234 includes a number of second hot-water grooves 236 to communicate with the first hot-water grooves 222 respectively. When a pressure difference between the cold water of the cold-water pressure room 233 and the hot water of the hot-water pressure room 234 generates, the valve core 23 moves automatically, an overlapped cross-sectional area of the first cold-water grooves 221 and the second cold-water grooves 235 and an overlapped cross-sectional area of the first hot-water grooves 222 and the second hot-water grooves 236 are changed so that an inflow amount of the cold and the hot waters are changed accordingly to balance the water pressure.

Figure 6:
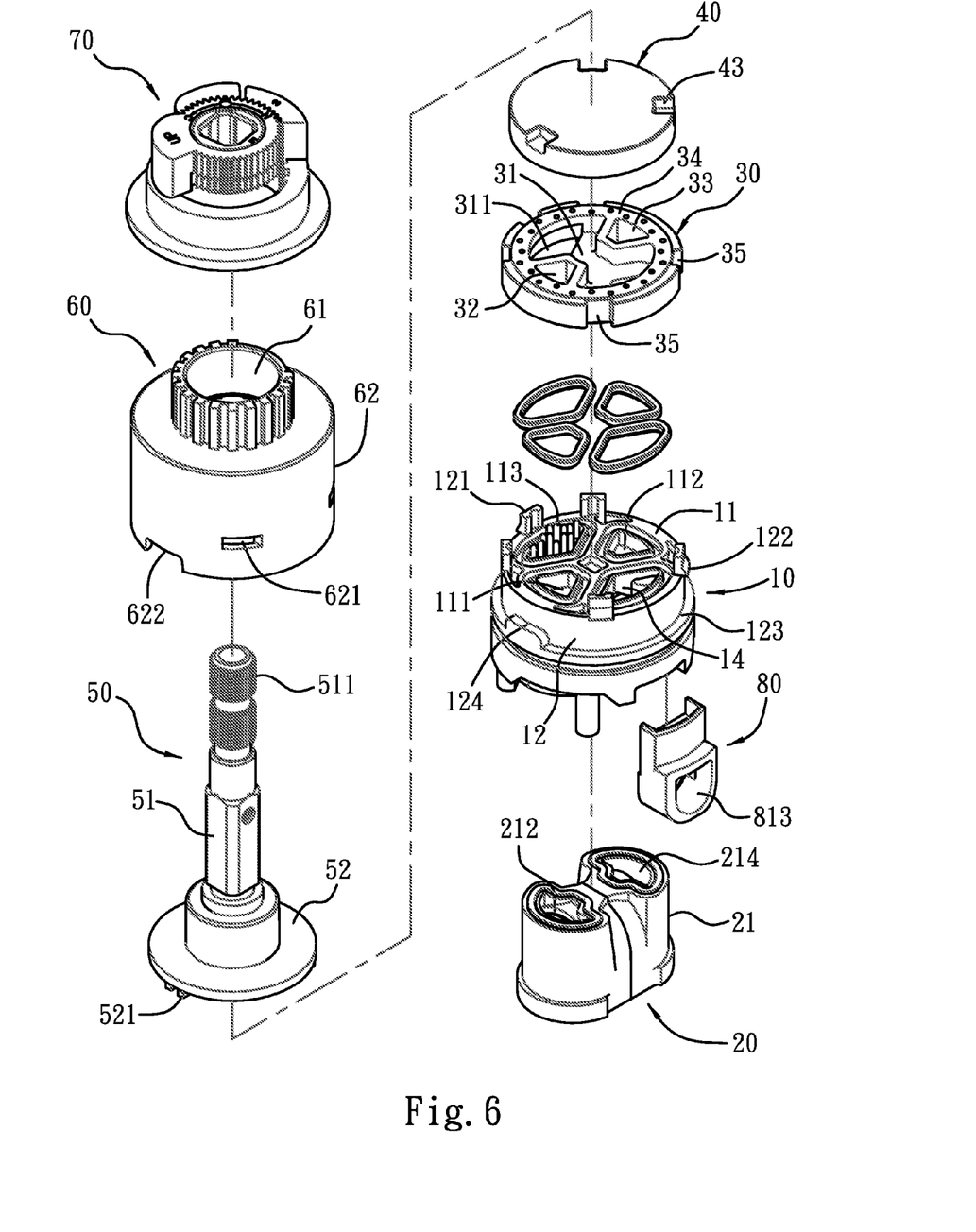
FIG. 6 is a perspective view showing the exploded components of the temperature controlling device according to the preferred embodiment of the present invention.
Figure 7:
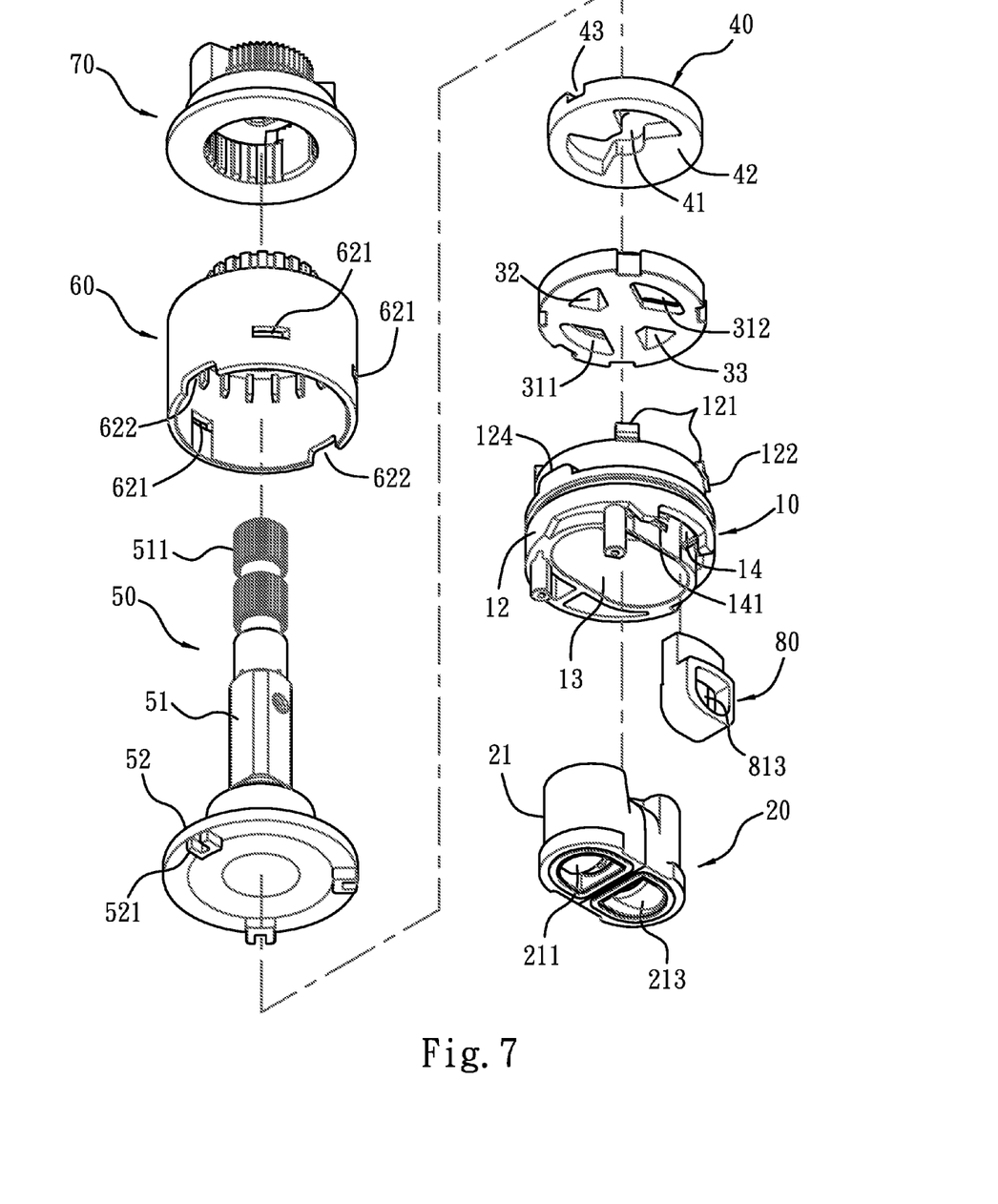
FIG. 7 is another perspective view showing the exploded components of the temperature controlling device according to the preferred embodiment of the present invention.
Figure 12:
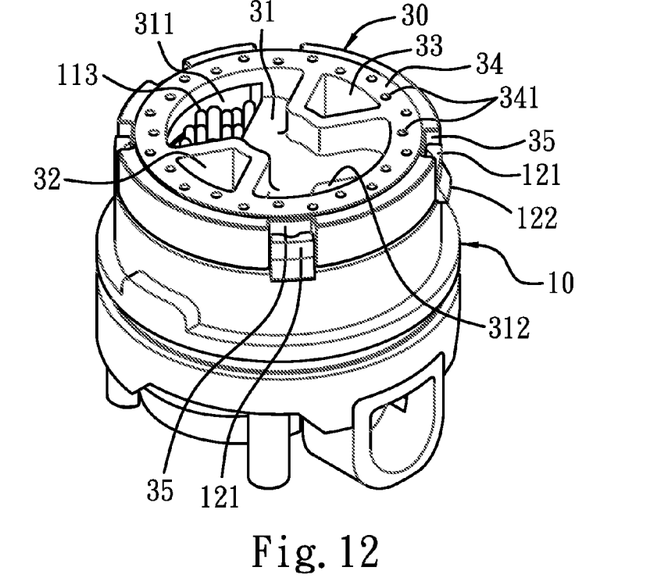
FIG. 12 is a perspective view showing a lower ceramic member of the temperature controlling device of the preferred embodiment of the present invention being fixed on the base.

Referring to FIGS. 6, 7, and 12, the lower ceramic member 30 is installed on the top wall 11 of the base 10 and includes a wing-shaped second cavity 31 disposed on a top surface thereof and a first orifice 32 to flow the cold water and a second orifice 33 to flow the hot water fixed on two sides of the second cavity 31 respectively to communicate with the first hole 111 and the second hole 112 of the top wall 11 of the base 10; the second cavity 31 includes a first opening 311 fixed on one end thereof to insert the noise eliminating post 113 of the base 10 into the second cavity 31 therefrom and a second opening 312 fixed on another end thereof to communicate with the tunnel 14 of the base 10.

The lower ceramic member 30 includes a contacting face 34 defined on the top surface thereof around the first orifice 32, the second orifice 33, and the second cavity 31, and the contacting face 34 includes a number of oil bores 341 arranged thereon to store lubricating oil.

The lower ceramic member 30 also includes a number of fixing slots 35 formed therearound; wherein there are five fixing slots 35 provided in this embodiment to retain with the positioning blocks 121 of the peripheral wall 12 of the base 10 to position the lower ceramic member 30.

As illustrated in FIGS. 6 and 7, the upper ceramic member 40 is actuated to be fixed on a top end of the lower ceramic member 30 and includes a wing-shaped third cavity 41 disposed on a bottom end thereof to correspond to the first orifice 32, the second orifice 33, and the second cavity 31 of the lower ceramic member 30; the third cavity 41 includes a close face 42 defined on a bottom surface thereof to close or open the first orifice 32 and the second orifice 33 of the lower ceramic member 30 with a rotation of the upper ceramic member 40, and the close face 42 is used to close the contacting face 34 of the lower ceramic member 30, the lubricating oil stored in the oil bores 341 of the lower ceramic member 30 is applied to lubricate the lower ceramic member 30 and the upper ceramic member 40 to rotate smoothly.

The upper ceramic member 40 also includes a plurality of retaining notches 43, wherein there are three retaining notches 43 arranged equiangularly in this embodiment.

The control shaft 50 includes an extension 51 and a radial extending disc 52 disposed on a bottom end of the extension 51; the extension 51 is made of a metal material, and the extending disc 52 is made of a plastic material and integrally formed on a bottom end of the extension 51; the control shaft 50 includes a forcing end 511 disposed on a top end thereof to input a rotating power, wherein the forcing end 511 of the control shaft 50 is rotated by using a fitted stem, and then the extending disc 52 is actuated to rotate the upper ceramic member 40; wherein the extending disc 52 includes a number of second locking projections 521 arranged on a bottom end thereof, and there are three second locking projections 521 arranged equiangularly in this embodiment so as to retain with the retaining notches 43 of the upper ceramic member 40, thereby actuating the upper ceramic member 40 to rotate.

Figure 13:
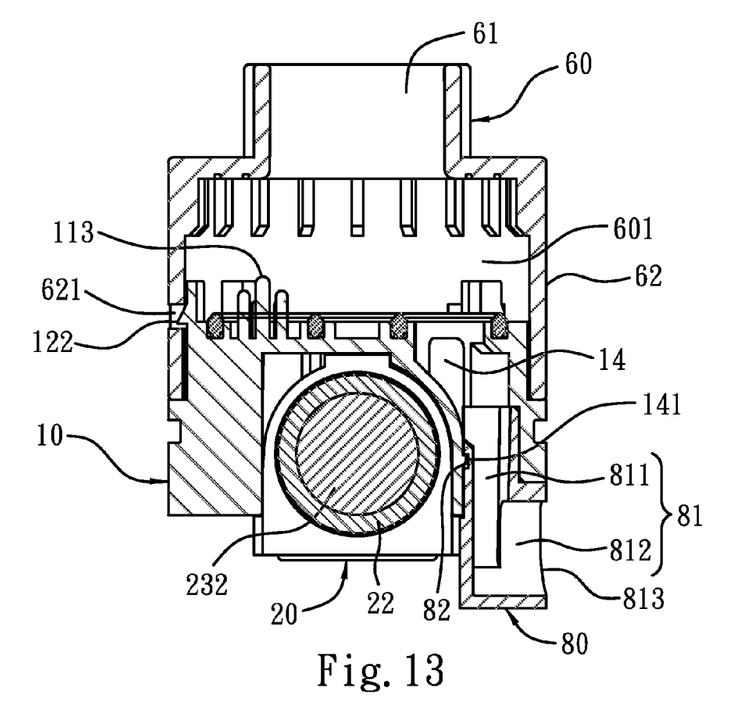
FIG. 13 is a cross sectional view showing a housing of the temperature controlling device of the preferred embodiment of the present invention being fixed on the base.

Referring to FIGS. 6, 7, and 13, the housing 60 is served to cover the base 10, and between the housing 60 and the base 10 is defined a receiving space 601 to receive and limit the lower ceramic member 30, the upper ceramic member 40, and the control shaft 50, and the housing 60 includes an aperture 61 fixed on a top end thereof to communicate with the receiving space 601 and to extend out of the extension 51 of the control shaft 50.

The side face 62 of the housing 60 further includes a number of recesses 621 arranged thereon to retain with the hooks 122 of the base 10, thus connecting the housing 60 and the base 10 together, and includes at least one defining gap 622 formed on a bottom end thereof to retain with the limiting tabs 124 of the base 10.

The adjusting mechanism 70 is fixed on the top end of the housing 60 and retained with the extension 51 of the control shaft 50 to adjust and limit the control shaft 50 to rotate. Due to the adjusting mechanism 70 is a well-know art, further remarks are omitted.

The watering component 80 is positioned in the tunnel 14 of the base 10 and includes a passage 81 disposed therein, wherein the passage 81 includes a vertical path 811 and a horizontal path 812, both of which are in communication with each other, and between the vertical and the horizontal paths 811, 812 is formed a 90 degree angle, the horizontal path 812 includes an outflow port 813 disposed on a distal end thereof so that a vertical flowing water from the tunnel 14 is guided to generate a horizontal flowing water after making a turn, and then the horizontal flowing water is jetted out of the third channel 2c, thereby forming a siphon effect opposite to the fourth channel 2d as shown in FIG. 1.

A profile of an outer surface of the watering component 80 matches with that of the tunnel 14 so that the watering component 80 is retained in the tunnel 14, the watering component 80 includes an engaging cutout 82 fixed on the outer surface thereof to retain with the first locking projection 141 of the tunnel 14.

Figure 14:
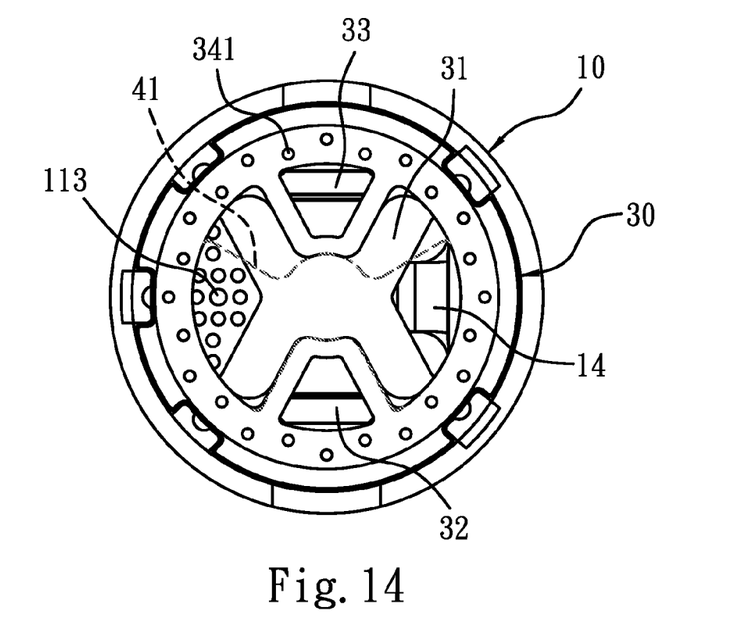
FIG. 14 is a cross-sectional plan view showing the operation of the temperature controlling device according to the preferred embodiment of the present invention.

With reference to FIG. 14, the first orifice 32 and the second orifice 33 of the lower ceramic member 30 are closed by the close face 42 of the upper ceramic member 40 so that after the cold and the hot waters from the pressure balance valve 20 flow into the first orifice 32 and the second orifice 33 of the lower ceramic member 30, they can not further flow into the third cavity 41 of the upper ceramic member 40, thus controlling the temperature controlling device 1 to be in a close state without flowing water.

Figure 15:
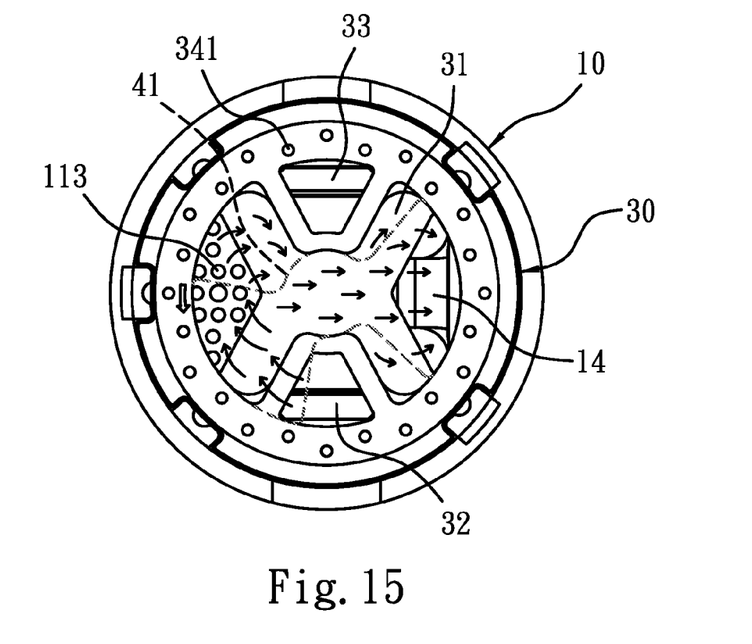
FIG. 15 is another cross-sectional plan view showing the operation of the temperature controlling device according to the preferred embodiment of the present invention.

Referring to FIG. 15, when desiring to take a shower, the temperature controlling device 1 is turned on to drive the control shaft 50, thereafter the upper ceramic member 40 is actuated by the control shaft 50 to rotate toward a predetermined direction, wherein the upper ceramic member 40 is rotated toward an anti-clockwise direction so that the third cavity 41 of the upper ceramic member 40 communicates with the noise eliminating posts 113 and the first orifice 32, and then the cold water of the first orifice 32 flows into the noise eliminating posts 113 from one side of the third cavity 41, hence the noise eliminating posts 113 are capable of being used to decrease water impact and water hammer noises, stabilizing water flow.

Thereafter, the cold water which flows through the noise eliminating posts 113 further flows toward another side of the second opening 312 and then flows out of the faucet via the tunnel 14, the watering component 80, and the outflow port 813; wherein the water is guided toward the third channel 2c directly to generate a jet flow so that the siphon effect opposite to the fourth channel 2d is formed as shown in FIG. 1. Thereby, a part of the water is stopped flowing toward the fourth channel 2d, thus preventing the spray shower head from leaking water.

Figure 16:
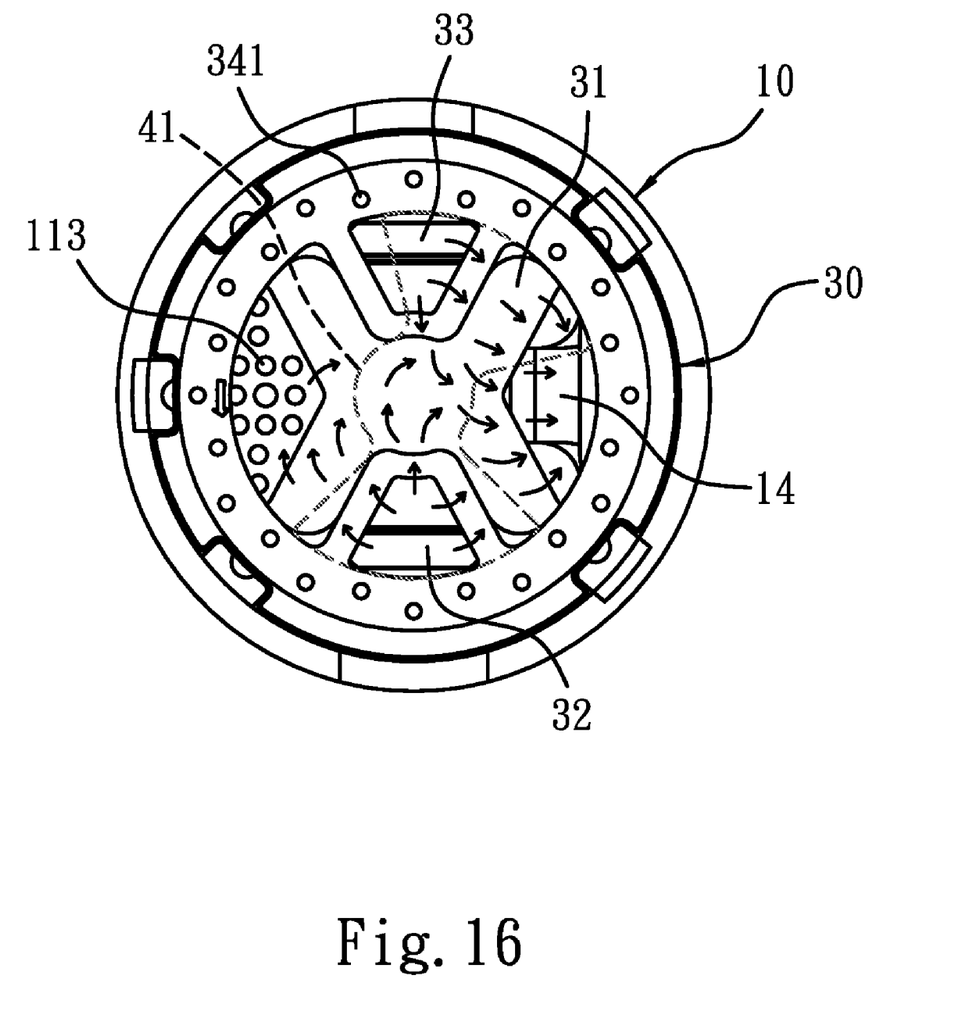
FIG. 16 is another cross-sectional plan view showing the operation of the temperature controlling device according to the preferred embodiment of the present invention.

As illustrated in FIG. 16, the handle of the temperature controlling device 1 is rotated further, and the third cavity 41 of the upper ceramic member 40 is aligned with the first orifice 32 completely, a communicating area of the third cavity 41 and the second orifice 33 is increased so that the cold and the hot waters from the first and the second orifices 32, 33 are individually guided into the third cavity 41, and then the cold and the hot waters from the third cavity 41 flow into the second cavity 31 of the lower ceramic member 30 to be mixed together, thereafter the mixed water flows out of the third channel 2c through the second opening 312, the tunnel 14, the watering component 80, and the outflow port 813, thereby flowing water from the faucet.

When shifting water from the faucet to the spray shower head, a rotating bar of the faucet is pulled upward to close the faucet, and the mixed water from the temperature controlling device 1 is guided to the fourth channel 2d by ways of a water pressure effect, thus flowing water from the spray shower head.

The lower ceramic member 30 of the temperature controlling device 1 is formed in a symmetrical wing shape to improve a conventional second cavity formed in an unsymmetrical signal wing, therefore a rotating resistance of the upper ceramic member 40 is lowered so that the control shaft 50 is rotated easily and smoothly.

The oil bores 341 of the contacting face 34 of the lower ceramic member 30 are capable of lubricating the lower ceramic member 30 and the close face 42 of the upper ceramic member 40 to decrease the rotating resistance of the upper ceramic member 40 relative to the lower ceramic member 30, thereby shifting the handle easily and stably.

Furthermore, the noise eliminating posts 113 of the base 10 are capable of providing shock absorbing and water guiding effects to eliminate water hammer resulting from the pressure difference.

While we have shown and described various embodiments in accordance with the present invention, it is clear to those skilled in the art that further embodiments may be made without departing from the scope of the present invention.

What is claimed is:

1. A temperature controlling device comprising a base including a top wall and a peripheral wall to define a chamber with a mouth facing downward; the top wall including a first hole to flow the cold water and a second hole to flow the hot water, both of which are symmetrical to each other and communicate with the chamber; between one side of a bottom end of the peripheral wall and the top wall being defined a tunnel to flow the cold and the hot waters separating from the chamber, the top wall including a plurality of noise eliminating posts arranged thereon relative to the tunnel; a temperature balance valve retained in the chamber of the base and including a first inlet to flow the cold water and a second inlet to flow the hot water, both of which are disposed on two sides of a bottom end of the temperature balance valve respectively, a first outlet to flow the cold water and a second outlet to flow the hot water, both of which are disposed on two sides of a top end of the temperature balance valve respectively are communicated with the first hole and the second hole individually; a lower ceramic member installed on the top wall of the base and including a wing-shaped second cavity disposed on a top surface thereof, a first orifice to flow the cold water and a second orifice to flow the hot water fixed on two sides of the second cavity respectively to communicate with the first hole and the second hole of the top wall of the base; the second cavity including a first opening fixed on one end thereof to insert the noise eliminating posts of the base into the second cavity therefrom and a second opening fixed on another end thereof to communicate with the tunnel of the base; an upper ceramic member actuated to be fixed on a top end of the lower ceramic member and including a wing-shaped third cavity disposed on a bottom end thereof to correspond to the first orifice, the second orifice, and the second cavity of the lower ceramic member; the third cavity including a close face defined on a bottom surface thereof to close or open the first orifice and the second orifice of the lower ceramic member with a rotation of the upper ceramic member; a control shaft including an extension and a radial extending disc disposed on a bottom end of the extension; the control shaft including a forcing end disposed on a top end thereof to input a rotating power; a housing served to cover the base, and between the housing and the base being defined a receiving space to receive and limit the lower ceramic member, the upper ceramic member, and the control shaft, and the housing includes an aperture fixed on a top end thereof to communicate with the receiving space and to extend out of the extension of the control shaft.

2. The temperature controlling device as claimed in claim 1, wherein the lower ceramic member includes a contacting face defined on the top surface thereof around the first orifice, the second orifice, and the second cavity to contact with the close face of the upper ceramic member, and the contacting face includes a number of oil bores arranged thereon.

3. The temperature controlling device as claimed in claim 1 further comprising a watering component positioned in the tunnel of the base and includes a passage disposed therein so that a vertical flowing water from the tunnel is guided to generate a horizontal flowing water after making a turn.

4. The temperature controlling device as claimed in claim 3, wherein the tunnel of the base includes a first locking projection disposed on an inner surface thereof relative to the chamber; a profile of an outer surface of the watering component matches with that of the tunnel so that the watering component is retained in the tunnel, the watering component includes an engaging cutout fixed on the outer surface thereof to retain with the first locking projection of the tunnel.

5. The temperature controlling device as claimed in claim 4, wherein the temperature balance valve includes a holder, a casing secured in the holder, and a valve core moving axially in the casing; the first inlet and the second inlet are disposed on two sides of a bottom end of the holder respectively, and the first outlet and the second outlet are fixed on two sides of a top end of the holder individually.

6. The temperature controlling device as claimed in claim 5, wherein the holder is comprised of two symmetrical covers which are separated apart from each other and combined together, and a first cavity is defined between the combined covers to receive and limit the valve core, one of the covers includes the first inlet disposed on a bottom end thereof and the first outlet fixed on a top end thereof, and another cover including the second inlet formed on a bottom end thereof and the second outlet arranged on a top end thereof.

7. The temperature controlling device as claimed in claim 1, wherein the upper ceramic member includes a plurality of retaining notches, and the extending disc includes a number of second locking projections arranged on a bottom end thereof to retain with the retaining notches of the upper ceramic member.

8. The temperature controlling device as claimed in claim 7, wherein the peripheral wall of the base includes a number of positioning blocks formed on a top end thereof; the lower ceramic member includes a number of fixing slots formed therearound to retain with the positioning blocks.

9. The temperature controlling device as claimed in claim 1, wherein the peripheral wall of the base includes a plurality of hooks arranged on a top end thereof; a side face of the housing further includes a number of recesses arranged thereon to retain with the hooks of the base.

10. The temperature controlling device as claimed in claim 1, wherein there are at least two hooks fixed on the top end of the peripheral wall of the base, and each hook is comprised of one selected positioning blocks; the side face of the housing includes at least two recesses arranged thereon to retain with the hooks of the base.

11. The temperature controlling device as claimed in claim 1, wherein and the peripheral wall includes a stepped fringe fixed on a middle section thereof, and the stepped fringe includes at least one limiting tab fixed thereon; the side face of the housing includes at least one defining gap formed on a bottom end thereof to retain with the limiting tabs of the base.

12. The temperature controlling device as claimed in claim 1 further comprising an adjusting mechanism fixed on the top end of the housing and retained with the extension of the control shaft to adjust and limit the control shaft to rotate.

* * * * *